C. D. YOUNG.
CAR TRUCK SIDE FRAME.
APPLICATION FILED JUNE 21, 1912.
1,071,127.
Patented Aug. 26, 1913.
2 SHEETS—SHEET 1.
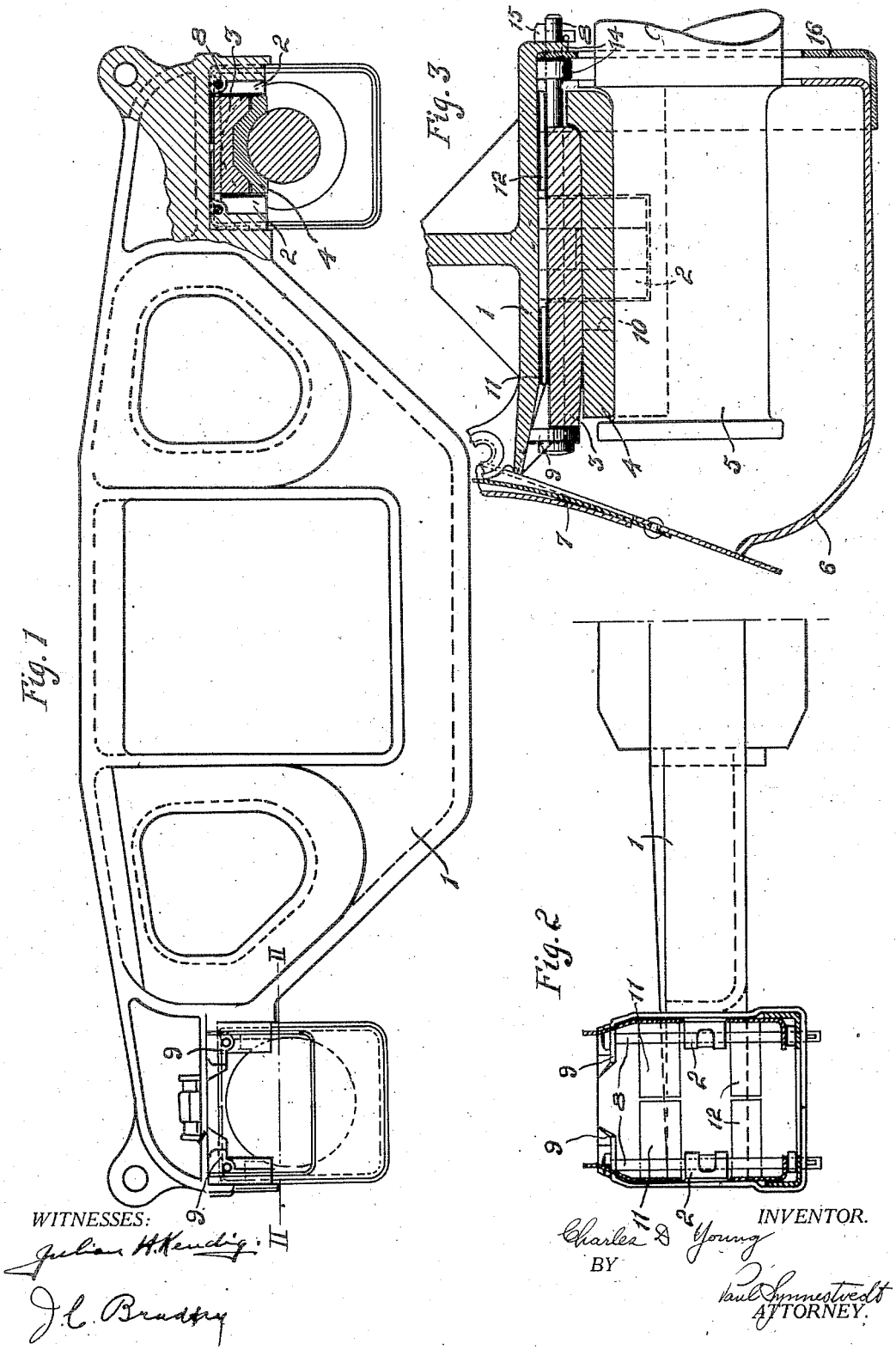
WITNESSES:
INVENTOR.
Charles D. Young
BY
Paul Synnestvedt
ATTORNEY.

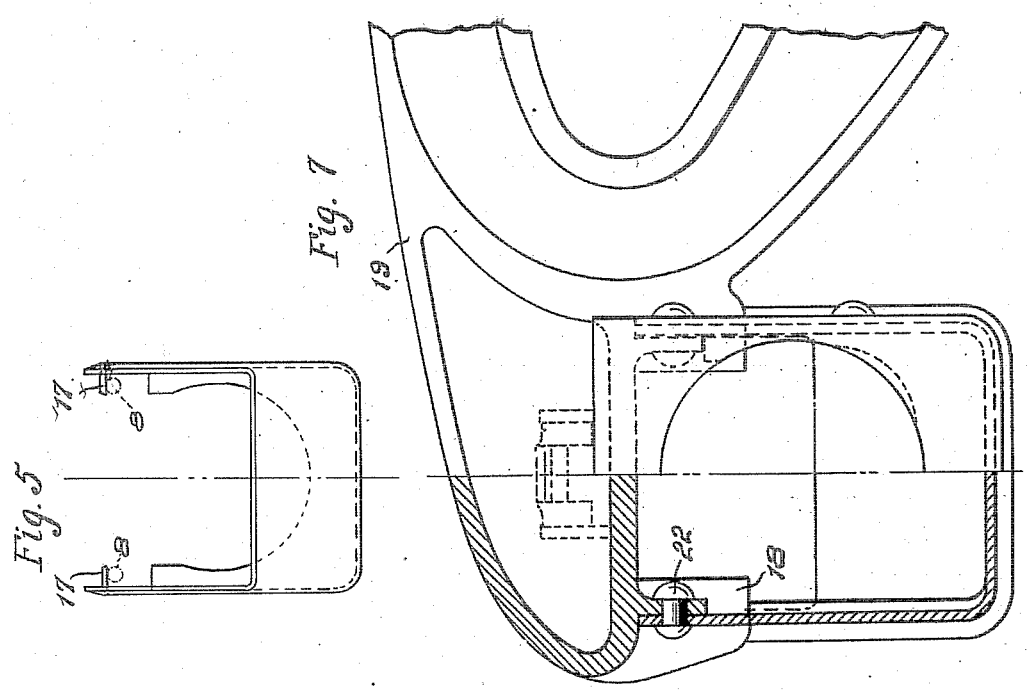
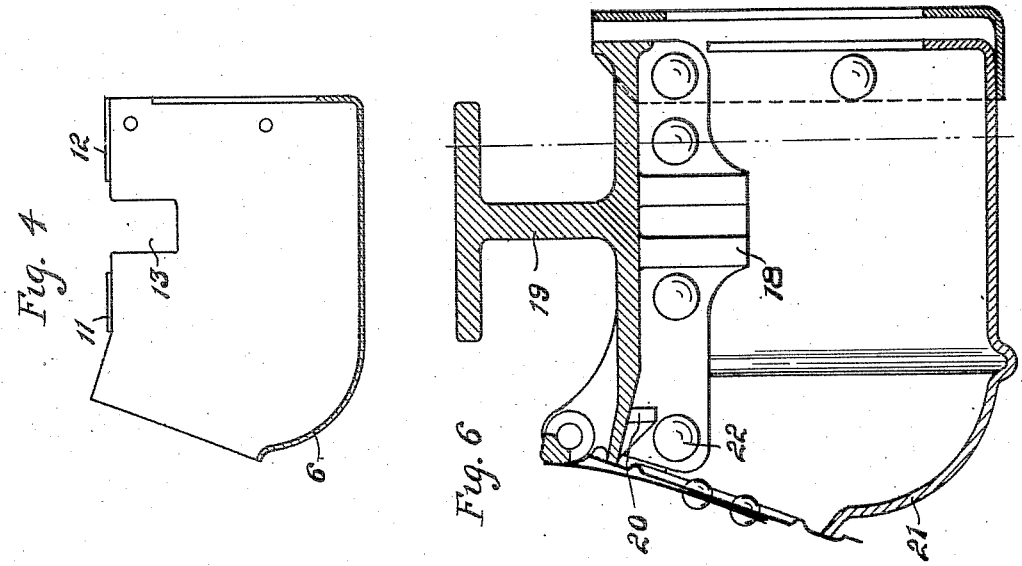

UNITED STATES PATENT OFFICE.

CHARLES D. YOUNG, OF ALTOONA, PENNSYLVANIA.

CAR-TRUCK SIDE FRAME.

1,071,127.

Specification of Letters Patent. Patented Aug. 26, 1913.

Application filed June 21, 1912. Serial No. 704,997.

*To all whom it may concern:*

Be it known that I, CHARLES D. YOUNG, a citizen of the United States, residing at Altoona, in the county of Blair and State of Pennsylvania, have invented certain new and useful Improvements in Car-Truck Side Frames, of which the following is a specification.

The invention relates to car truck side frames, and particularly to that portion of the frame in which the axles of the wheels are journaled. The invention has for its primary objects, the provision of a side frame having a journal box construction of increased security and strength; the provision of a construction in which the cellar is readily removable, but is held in position without danger or possibility of accidental displacement, and the provision of a simplified and improved structure wherein all the parts of the journal box on which a load carrying strain is imposed are integral with the side frame, thus eliminating all separate parts which would otherwise require securing devices for mounting them in position. Certain embodiments of the invention are illustrated in preferred form in the accompanying drawings, wherein—

Figure 1 is a side elevation of a car truck frame having my improvement, the journal box at one end of the truck being an end elevation, and at the other end in section, Fig. 2 is a partial bottom view and partial section, the section through the journal box being taken on line II—II of Fig. 1, Fig. 3 is a longitudinal section on an enlarged scale through one of the journal boxes, Fig. 4 is a longitudinal section through the cellar or lower portion of the journal box taken by itself, Fig. 5 is an end elevation of a slightly modified form of cellar, and Figs. 6 and 7 illustrate still another modification, Fig. 6 being a longitudinal section through the structure, and Fig. 7 being a partial end elevation and partial section.

Referring to the drawings, 1 is the body of the side truck frame, preferably of cast steel; 2 are the bearing lugs or members integral with the side frame and projecting downward from the lower face thereof at the ends in position to hold the wedges and bearings in position; 3 is a wedge, which is of the usual form as indicated in Figs. 1 and 3; 4 is a brass or bearing which is also of the ordinary type, and lies beneath the wedge; 5 is the axle of the wheels; 6 is the lower portion of a journal box or cellar as it is usually called, such cellar being preferably made of pressed steel and being supported in a novel manner to be more particularly described hereinafter; 7 is the lid of the cellar normally spring held closed in the usual manner; and 8 are a pair of securing bolts whose function will be pointed out hereinafter.

The wedge 3 and bearing member 4 are maintained in position against sidewise movement by means of the downwardly projecting lugs or members 2, 2, which as heretofore pointed out are integral with the body of the side frame 1, and the wedge 3 is held against endwise movement by means of the lugs 9, which lugs project downwardly from the lower face of the side frame 1 at the end, and are cast integral with such side frame. From this it will be seen that all the weight or strain bearing portions of the journal box are integral with the side frame, the vertical weight as well as the lateral and endwise strain being imposed upon such integral portions and including the stop lugs 2 and the end lugs or members 9. The wedge 3 is maintained against outward movement, by the lugs or members 9, and the bearing 4 is maintained against inward movement, that is, movement to the right, by means of the usual stop 10, indicated in dotted lines in Fig. 3, which takes against the side of the stop lug 2 in the usual manner.

The cellar 6 or lower portion of the journal box is supported in a novel manner constituting one of the important features of my invention. Portions 11, 11, and 12, 12, of the upper side edges of the cellar are bent inward as indicated in Fig. 2, and when the cellar is in position, these edges or strips 11, 11, and 12, 12, lie above the wedge 3, and are clamped between the top surface of such wedge and the under face of the side frame 1 as indicated in Fig. 3. The cellar is thus securely maintained in position without the necessity of any additional securing means, the weight of the frame upon the strips 11 and 12 maintaining the cellar very firmly in position. The sides of the cellar are of course cut away as indicated at 13 (Fig. 4) in order to receive the downwardly projecting stop lugs 2.

In order to guard against the accidental displacement of the cellar in case the car is derailed and the weight of the side frame removed from the wedge, the bolts 8 are provided, these bolts 8 extending through the lugs 9, 2, and 14, all integral with the side frame, the bolts being held against endwise displacement by means of the cotters 15. It will be seen that these bolts 8 lie beneath the strips 11 and 12 so that upward movement of the side frame with respect to the cellar is prevented, and in case the weight of the side frame is removed from the strips, the cellar will be still held in position by means of the bolts. By reference to Fig. 3 it will be noted that the heads of the bolts 8 lie opposite the lid 7 of the cellar, so that by opening this lid the bolts may be withdrawn endwise. The lid of the cellar guards the bolts against endwise displacement in case the cotters 15 should become accidentally displaced. The usual dustguard 16 is provided, which dustguard is riveted to the end of the cellar.

In Fig. 5 a modified type of construction is illustrated, the cellar in this construction differing from that shown in Fig. 2 in that the inturned upper edges or strips 17 corresponding to the strips 11 and 12 in the construction of Fig. 2 are made long enough only to extend over the bolts 8, so that the cellar is entirely supported from such bolts 8 instead of being supported also by the wedges as in the construction of Fig. 2. In this construction the cellar may be detached by merely removing the bolts 8 through the outer end of the cellar. In this construction it obviously becomes particularly important that the bolts lie inside the cellar and be held against endwise movement by the springheld lid thereof.

In the construction of Figs. 1, 2, and 3, the parts are disassembled by jacking up the side frame 1 after the removal of the bolts 8, which movement of the side frame relieves the weight upon the strips 11 and 12, and carries the lugs 9 to a position such that the wedge 3 may be removed outwardly, and then the bearing 4, thus leaving the axle 5 free of the cellar, bearing, and wedge.

The construction of Figs. 6 and 7 involves another modification wherein the cellar is riveted in position instead of being readily detachable as in the preferred type of construction. The construction is similar to that heretofore described in that the stop lugs 18 corresponding to the lugs 2 of the construction of Figs. 1, 2, and 3, are integral with the body of the side frame 19, and in that the stops 20 for preventing end movement of the wedge corresponding to the stops 9 of Figs. 1, 2, and 3, are also integral with the body of the side frame, so that in this construction as in the preferred construction, all the weight and strain bearing portions of the journal box are integral with the side frame. The cellar 21 is secured rigidly in position upon the side frame by means of the rivets 22.

Having thus described my invention and illustrated its use, what I claim as new and desire to secure by Letters Patent is the following:

1. In a car truck side frame, a bearing, a wedge for maintaining the bearing in position, stop lugs projecting downward from the side frame and integral therewith for engaging the side edges of the wedge, a cellar with inturned upper edges extending up past the bearing and along side the stop lugs, and detachable means secured to the side frame for supporting the cellar from its upper inturned edges.

2. In a car truck side frame, a bearing, a wedge thereabove, means integral with the side frame and preventing endwise and lateral movement of the wedge, a cellar extending up past the bearing and having its edges turned in, and means detachably secured to the side frame for supporting the cellar from its upper inner edges.

3. In a car truck side frame, a bearing, a wedge, and lugs integral with the side frame and projecting downwardly therefrom for holding the bearing and wedge against sidewise or endwise movement, a cellar in position beneath and surrounding the wedge and bearing, and means lying inside the cellar for securing it to the side frame.

4. In a car truck side frame, a bearing, a wedge, and lugs integral with the side frame and projecting downwardly therefrom for holding the bearing and wedge against sidewise or endwise movement, removable bolts extending longitudinally of the sides of the wedge and mounted in the side frame, and a cellar having its upper side edges turned in so as to lie over the bolts and be maintained in position thereby until the bolts are removed.

5. In a car truck side frame, a bearing, a wedge, and lugs integral with the side frame and projecting downwardly therefrom for holding the bearing and wedge against sidewise or endwise movement, removable bolts extending longitudinally of the sides of the wedge and mounted in the side frame, a cellar having its edges turned in so as to lie over the bolts, and a lid for the cellar normally held in closed position opposite the ends of the bolts whereby endwise movement of the bolts is guarded against.

6. In a car truck side frame, a bearing, a wedge, members on the side frame projecting downwardly therefrom in front and at the sides of the wedge, bolts extending longitudinally of the sides of the wedge and mounted in the said members, and a cellar having its upper side edges turned in so as to lie over the bolts and be maintained in position until the bolts are removed.

7. In a car truck side frame, a bearing, a wedge, members on the side frame projecting downwardly therefrom in front and at the sides of the wedge, bolts extending longitudinally of the sides of the wedge and mounted in the said members, and a cellar having its upper side edges turned in so as to lie over the bolts and be maintained in position until the bolts are removed, the said bolts lying within the cellar with their heads opposite the lid thereof whereby the bolts may be removed and inserted through such lid.

8. In a car truck side frame, a bearing, a wedge, means projecting downwardly from the side frame for holding the wedge and bearing against movement, removable bolts mounted in the said means, and a cellar having its upper side edges turned in so as to lie over and be supported by the said bolts.

9. In a car truck side frame, a bearing, a wedge, means projecting downwardly from the side frame for holding the wedge and bearing against movement, removable bolts mounted in the said means, and a cellar having a lid normally springheld closed and having its upper side edges turned in so as to hook over the said bolts, the said lid being opposite the heads of the bolts whereby removal thereof is prevented until the lid is opened.

10. In a car truck side frame, a bearing, a wedge, means projecting downwardly from the side frame for holding the wedge and bearing against movement, a cellar having its upper side edges turned in so as to lie over the wedge and between such wedge and the lower face of the side frame, and bolts mounted in the side frame and lying inside the cellar beneath the said turned-in side edges of the cellar.

11. In a car truck side frame, a bearing, a wedge therefor, bolts extending longitudinally of the sides of the wedge and carried by the side frame, and a cellar having its upper edges turned in so as to lie over the bolts.

12. In a car truck side frame, a bearing, a wedge therefor, bolts extending longitudinally of the sides of the wedge and carried by the side frame, a cellar having its upper edges turned in so as to lie over the bolts and having an opening at its end opposite the heads of the bolts whereby they may be removed through the said opening, and a lid for closing the opening and maintaining the bolts against removal.

In testimony whereof I have hereunto signed my name in the presence of the two subscribed witnesses.

CHARLES D. YOUNG.

Witnesses:
B. C. McCORMICK,
J. L. WERTZBERGER.